United States Patent
Lonstein et al.

(10) Patent No.: US 10,449,876 B2
(45) Date of Patent: Oct. 22, 2019

(54) MULTI-POSITION CHAIR WITH TILTABLE, ROTATABLE AND SLIDABLE SEAT SHELL

(71) Applicants: Jeffrey H. Lonstein, Boca Raton, FL (US); Rosemary A. Lonstein, Boca Raton, FL (US)

(72) Inventors: Jeffrey H. Lonstein, Boca Raton, FL (US); Rosemary A. Lonstein, Boca Raton, FL (US)

(*) Notice: Subject to any disclaimer, the term of this patent is extended or adjusted under 35 U.S.C. 154(b) by 0 days.

(21) Appl. No.: 15/235,728

(22) Filed: Aug. 12, 2016

(65) Prior Publication Data

US 2017/0182914 A1 Jun. 29, 2017

Related U.S. Application Data (60) Provisional application No. 62/272,268, filed on Dec. 29, 2015.

(51) Int. Cl.
*B60N 2/06* (2006.01)
*B60N 2/28* (2006.01)
(Continued)

(52) U.S. Cl.
CPC ........... *B60N 2/2875* (2013.01); *A47D 1/006* (2013.01); *A47D 1/0081* (2017.05);
(Continued)

(58) Field of Classification Search
CPC ...... B60N 2/26; B60N 2/2812; B60N 2/2848; B60N 2/2869; B60N 2/2875; A47D 1/006; A47D 1/0081; A47D 1/0085
(Continued)

(56) References Cited

U.S. PATENT DOCUMENTS 3,785,700 A * 1/1974 Kubo ..................... A47C 1/023
108/140
3,821,825 A * 7/1974 Bailey .................... B63B 29/04
114/363
(Continued)

FOREIGN PATENT DOCUMENTS

FR 2848157 A1 * 6/2004 ........... B60N 2/2821

OTHER PUBLICATIONS

PCT/US16/69148 International Search Report and Written Opinion dated Mar. 23, 2017.

*Primary Examiner* — Robert Canfield
(74) *Attorney, Agent, or Firm* — Glenn E. Gold, P.A.; Glenn E. Gold (57) ABSTRACT

A multi-position chair includes a seat shell, elongated seatbelts and a base assembly with pairs of members capable of tilting, rotating and sliding. The seat shell accommodates a child thereon. The seatbelts secure the child to the seat shell. The base assembly includes tilt, swivel and slide support mechanisms. The tilt support mechanism has first and second interfitted members pivotally coupled to one another. The swivel support mechanism has first and second interengaged members rotatably coupled to one another. The slide support mechanism has first and second intercoupled members linearly slidable relative to one another. The second intercoupled member defines a base platform for directly supporting the first intercoupled member in an upright orientation and thereby indirectly supporting, via the first intercoupled member, the first and second interengaged members and the second interfitted member in respective upright orientations.

8 Claims, 7 Drawing Sheets

(51) Int. Cl.
    *A47D 1/00*           (2006.01)
    *B60N 2/02*          (2006.01)

(52) U.S. Cl.
    CPC ......... *A47D 1/0085* (2017.05); *B60N 2/0232* (2013.01); *B60N 2/062* (2013.01); *B60N 2/2812* (2013.01); *B60N 2/2821* (2013.01); *B60N 2/2848* (2013.01); *B60N 2/2869* (2013.01)

(58) Field of Classification Search
    USPC .......... 297/256.12, 256.13, 256, 16, 344.24, 297/354.12
    See application file for complete search history.

(56) References Cited

U.S. PATENT DOCUMENTS

| | | | |
|---|---|---|---|
| 4,762,364 A | 8/1988 | Young | |
| 4,844,543 A * | 7/1989 | Ochiai | A47C 3/18 248/425 |
| 4,936,629 A * | 6/1990 | Young | B60N 2/2821 297/256.12 |
| 6,241,314 B1 | 6/2001 | Pufall | |
| 6,402,114 B1 * | 6/2002 | Carnahan | A47C 1/023 248/425 |
| 6,431,647 B2 * | 8/2002 | Yamazaki | B60N 2/2821 297/250.1 |
| 6,572,189 B1 | 6/2003 | Blaymore | |
| 6,746,080 B2 | 6/2004 | Tsugimatsu et al. | |
| 6,793,283 B1 | 9/2004 | Sipos | |
| 7,073,859 B1 | 7/2006 | Wilson | |
| 7,722,118 B2 * | 5/2010 | Bapst | A47D 9/02 297/256.12 |
| 7,753,444 B2 * | 7/2010 | Vallentin | B60N 2/2821 297/256.12 |
| 8,459,739 B2 * | 6/2013 | Tamanouchi | B60N 2/2806 297/256.12 |
| 8,651,572 B2 * | 2/2014 | Medeiros | A47D 1/002 297/256.1 |
| 8,702,169 B2 * | 4/2014 | Abadilla | B60N 2/062 297/256.12 |
| 8,967,716 B2 * | 3/2015 | Mountz | A47C 9/02 297/256.12 |
| 2002/0145319 A1 * | 10/2002 | Tsugimatsu | B60N 2/2806 297/256.13 |
| 2004/0178669 A1 | 9/2004 | Lady et al. | |
| 2006/0170262 A1 * | 8/2006 | Gold | B60N 2/2869 297/256.12 |
| 2007/0120404 A1 | 5/2007 | Bellows et al. | |
| 2009/0026819 A1 * | 1/2009 | Zahar | B60N 2/2806 297/256.16 |
| 2014/0138997 A1 * | 5/2014 | Schulz | B60N 2/0244 297/344.24 |
| 2014/0167472 A1 * | 6/2014 | Haller | B60N 2/508 297/344.22 |
| 2015/0258921 A1 * | 9/2015 | Chung | B60N 2/2821 297/256.16 |

\* cited by examiner

MULTI-POSITION CHAIR WITH TILTABLE, ROTATABLE AND SLIDABLE SEAT SHELL

CROSS REFERENCE(S) TO RELATED APPLICATION(S)

This U.S. non-provisional patent application claims the benefit of U.S. provisional patent application No. 62/272,268, filed on Dec. 29, 2015, and is hereby incorporated-by-reference herein its entirety.

FIELD OF THE INVENTION

The present invention relates to multi-position chairs and more particularly, is concerned with a multi-position chair with a tiltable, rotatable and slidable seat shell.

BACKGROUND OF THE INVENTION

Vehicular child seats are mandatory in the United States. They help prevent children from being injured during vehicle collisions and even during normal starts and stops of a vehicle and jostling of its occupants during normal traffic conditions.

A vehicular child seat typically is designed, and rightly so, with safeguards for the child occupant to be able to withstand these normal traffic conditions as well as vehicular collisions. However, in the case of a cramped smaller vehicle, this does make it difficult for a parent to secure or release the child to or from the child vehicular seat.

Accordingly, there remains a need in the art for an innovation that will overcome the deficiencies of past approaches and the problems that remain unsolved with respect to vehicular child seat design.

SUMMARY OF THE INVENTION

The present invention is directed to an innovation that overcomes the deficiencies of the past approaches and the problems that remain unsolved by providing a multi-position chair with a tiltable, rotatable and slidable seat shell adaptable to serve as a vehicular child seat and to be able to transfer it from a vehicle to a stroller.

In one aspect of the present invention, a multi-position chair includes:
  a seat shell for accommodating a child thereon, the seat shell having a bottom portion and a back portion affixed to and extending upright from the bottom portion;
  a child restraint on a front side of the back portion of the seat shell for securing the child to the seat shell; and
  a base assembly supporting the seat shell, the base assembly including
    a tilt support mechanism having first and second interfitted members pivotally coupled to one another,
    a swivel support mechanism having first and second interengaged members rotatably coupled to one another, and
    a base platform supporting the first and second interengaged members of the swivel support mechanism and the second interfitted member of the tilt support mechanism in an upright orientation such that the first interfitted member of the tilt support mechanism pivots relative to the second interfitted member about a horizontal axis between upright and tilted positions and the first interengaged member of the swivel support mechanism rotates relative to the second interengaged member of the swivel support mechanism about a vertical axis extending through the bottom portion of the seat shell in the upright position.

In another aspect of the present invention, the first interfitted member of the tilt support mechanism includes a single lug affixed to and protruding below an underside of the bottom portion of the seat shell. The second interfitted member of the tilt support mechanism includes a pair of lugs being laterally spaced apart from one another so as to receive and pivotally couple with the single lug between the pair of lugs. Also, the first interengaged member of the swivel support mechanism fixedly supports the second interfitted member of the tilt support mechanism.

In another aspect of the present invention, a multi-position chair includes:
  a seat shell for accommodating a child thereon, the seat shell having a bottom portion and a back portion affixed to and extending upright from the bottom portion;
  a child restraint on a front side of the back portion of the seat shell for securing the child to the seat shell; and
  a base assembly supporting the seat shell, the base assembly including
    a swivel support mechanism supporting the seat shell in an upright position and having first and second interengaged members rotatably coupled to one another, and
    a slide support mechanism having first and second intercoupled members being linearly displaceable relative to one another, the second intercoupled member directly supporting the first intercoupled member in an upright orientation and thereby indirectly supporting, via the first intercoupled member, the first and second interengaged members of the swivel support mechanism in the upright orientation such that the first interengaged member rotates relative to the second interengaged member about a vertical axis extending through the bottom portion of the seat shell in the upright position irrespective of the linear displacement of the first intercoupled member relative to the second intercoupled member.

In another aspect of the present invention, the first interengaging member of the swivel support mechanism includes a circular-shaped plate. The second interengaging member of the swivel support mechanism includes a cylindrical-shaped cavity supported by the slide support mechanism and receiving and rotatably coupled to the circular-shaped plate. The second interengaging member also includes a circular-shaped inner rim that overlies a peripheral edge of the circular-shaped plate so as to retain the circular-shaped plate within the cavity.

In another aspect of the present invention, a multi-position chair includes:
  a seat shell for accommodating a child thereon, the seat shell having a bottom portion and a back portion affixed to and extending upright from the bottom portion;
  a pair of elongated seatbelts laterally spaced apart from one another and attached to a front side of the back portion of the seat shell for securing the child to the seat shell; and
  a base assembly comprising
    a tilt support mechanism having first and second interfitted members pivotally coupled to one another,
    a swivel support mechanism having first and second interengaged members rotatably coupled to one another, and
    a slide support mechanism having first and second intercoupled members linearly slidable relative to one another, the second intercoupled member directly supporting the first intercoupled member in an upright orientation and thereby indirectly supporting, via the first intercoupled member, the first and second interengaged members of the swivel support mechanism and the second interfitted member of the tilt support mechanism in the upright orientation such that the first interfitted member of the tilt support mechanism pivots relative to the second interfitted member about a horizontal axis between upright and tilted positions and the first interengaged member of the swivel support mechanism rotates relative to the second interengaged member of the swivel support mechanism about a vertical axis extending through the bottom portion of the seat shell in the upright position irrespective of the linear displacement of the first intercoupled member relative to the second intercoupled member.

In another aspect of the present invention, the second intercoupled member of the slide support mechanism includes a base platform defining a track. The first intercoupled member of the slide support mechanism includes a rectangular-shaped body defining the cylindrical-shaped cavity and being mounted to the track of the base platform for undergoing linear movement in either one of opposite directions relative to the base platform.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1 through 9, there is illustrated an exemplary embodiment of a multi-position chair, generally designated 100, in accordance with aspects of the present invention. The multi-position chair 100 includes a seat shell 102 that accommodates a child (not shown) thereon. The multi-position chair 100 also includes a child restraint such as in the form of a pair of elongated seatbelts 104 employed to secure the child directly, or indirectly via an infant car seat, to the seat shell 102. The multi-position chair 100 further includes a base assembly 106 supporting the seat shell 102 and having pairs of members capable of tilting, rotating and sliding relative to each other to change the chair 100 between multiple positions. The base assembly 106 basically includes a tilt support mechanism 108, a swivel support mechanism 110, and a slide support mechanism 112.

More particularly, the seat shell 102 has a bottom portion 114 and a back portion 116 affixed to and extending upright from the bottom portion 114. Typically, the bottom and back portions 114, 116 are disposed substantially at a right angle to one another. The elongated seatbelts 104 are laterally spaced apart from one another, attached to upper and lower regions of the back portion 116 of the seat shell 102 and extend in generally parallel relationship along a front surface 118 of the back portion 116 of the seat shell 102. The seatbelts 104, being spring-biased to a retracted position by using conventionally known winding mechanisms, will fit over shoulders of the child and secure the child to the seat shell 102, or alternatively secure an infant car seat to the seat shell 102.

Figures 3, 4:
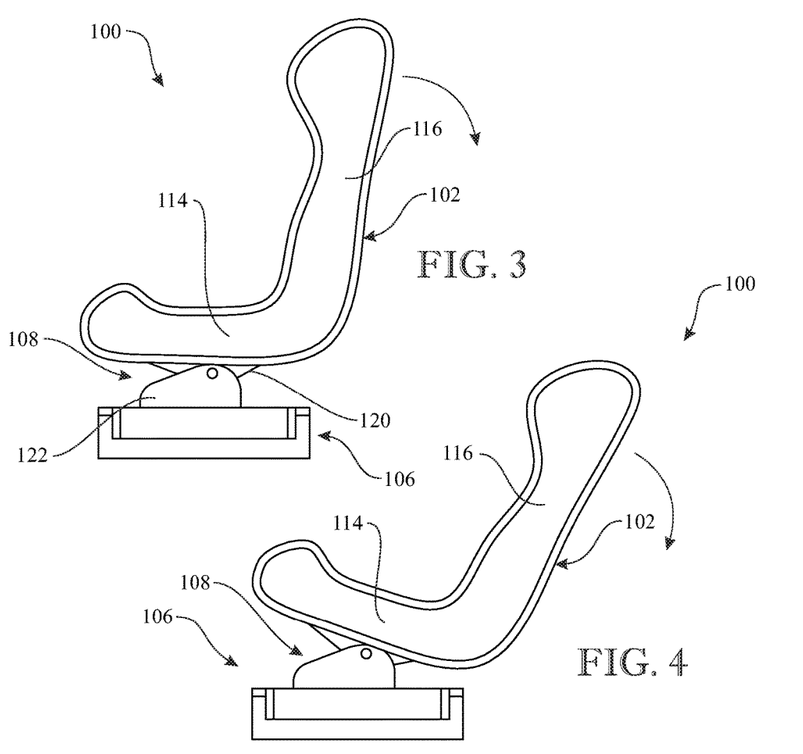
FIG. 3 presents a side elevation view of the multi-position chair originally introduced in FIG. 1, illustrating the seat of the chair in an upright position.
FIG. 4 presents a side elevation view of the multi-position chair originally introduced in FIG. 1, illustrating the seat of the chair in a partially tilted, or reclined, position.
Figure 5:
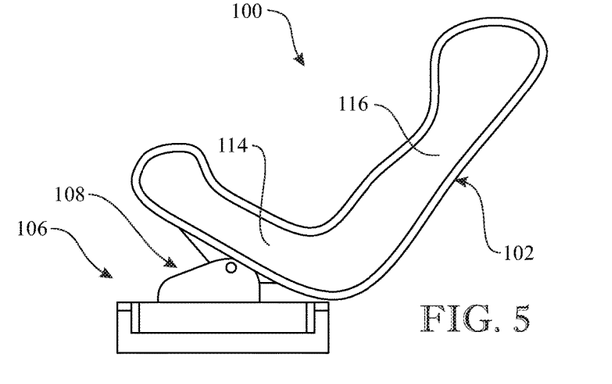
FIG. 5 presents a side elevation view of the multi-position chair originally introduced in FIG. 4, illustrating the seat of the chair in a fully tilted, or reclined, position.

The tilt support mechanism 108 of the base assembly 106 has first and second interfitted members 120, 122 being pivotally coupled to one another. The first of the interfitted members 120 of the tilt support mechanism 108 may be in the form of a single lug 120 affixed to and protruding below an underside of the bottom portion 114 of the seat shell 102. The second of the interfitted members 122 of the tilt support mechanism 108 may be in the form of a pair of lugs 122, being laterally spaced apart from one another and supported by the swivel support mechanism 110, so as to receive the single lug 120 therebetween. When the single lug 120 is received between the pair of lugs 122, respective holes therein are aligned with one another so that a pin 124 may be installed therethrough so as to rotatably couple the seat shell 102 upon the base assembly 106 for undergoing pivotal rocking or tilting movement, about a generally horizontally-extending longitudinal axis A defined by the pin 124, between upright and fully tilted, or reclined, positions, as respectively seen in FIGS. 3 and 5, and to and from a partially tilted, or reclined, position, as seen in FIG. 4.

Figure 1:
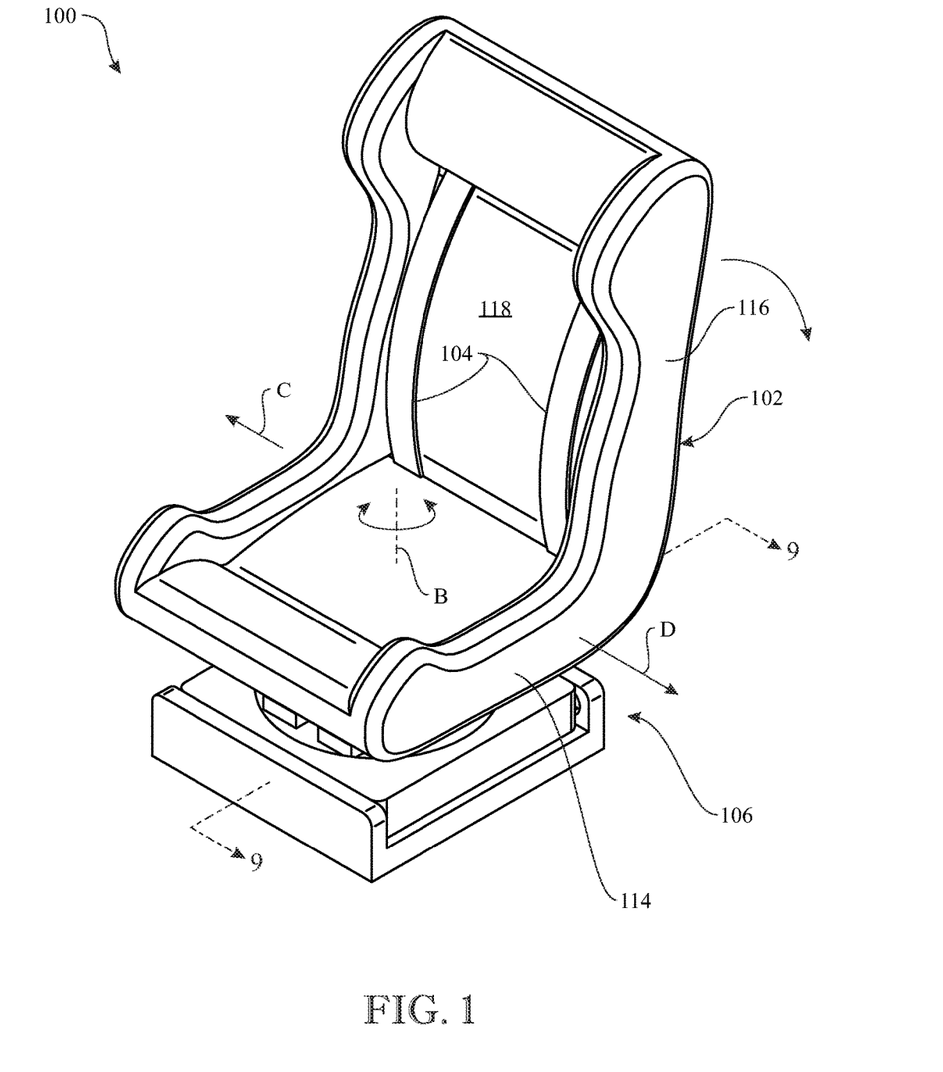
FIG. 1 presents a top isometric view of an exemplary embodiment of a multi-position chair in accordance with aspects of the present invention.
Figure 2:
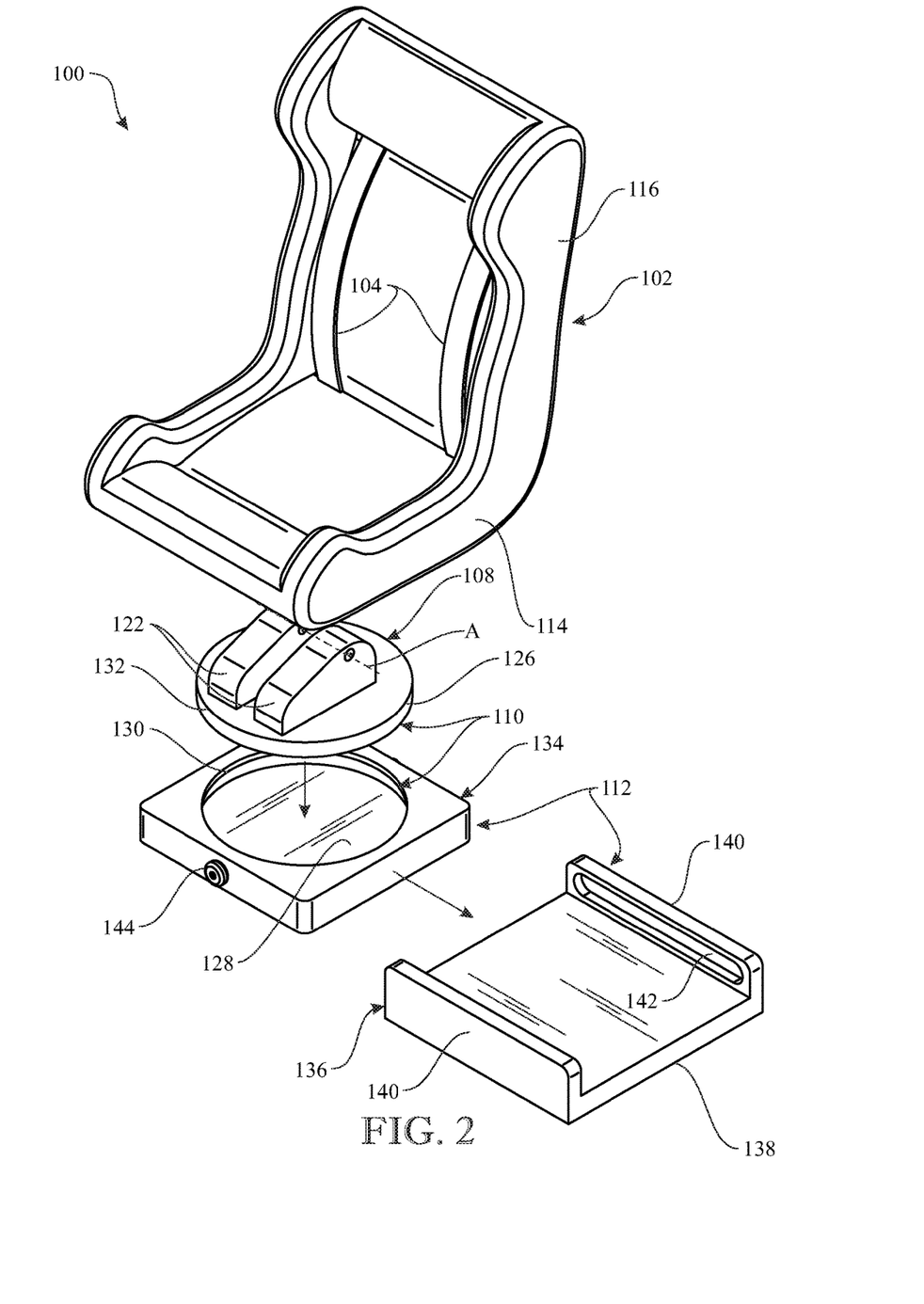
FIG. 2 presents a top exploded isometric view of the multi-position chair originally introduced in FIG. 1, illustrating the seat of the chair in an upright position.
Figure 6:
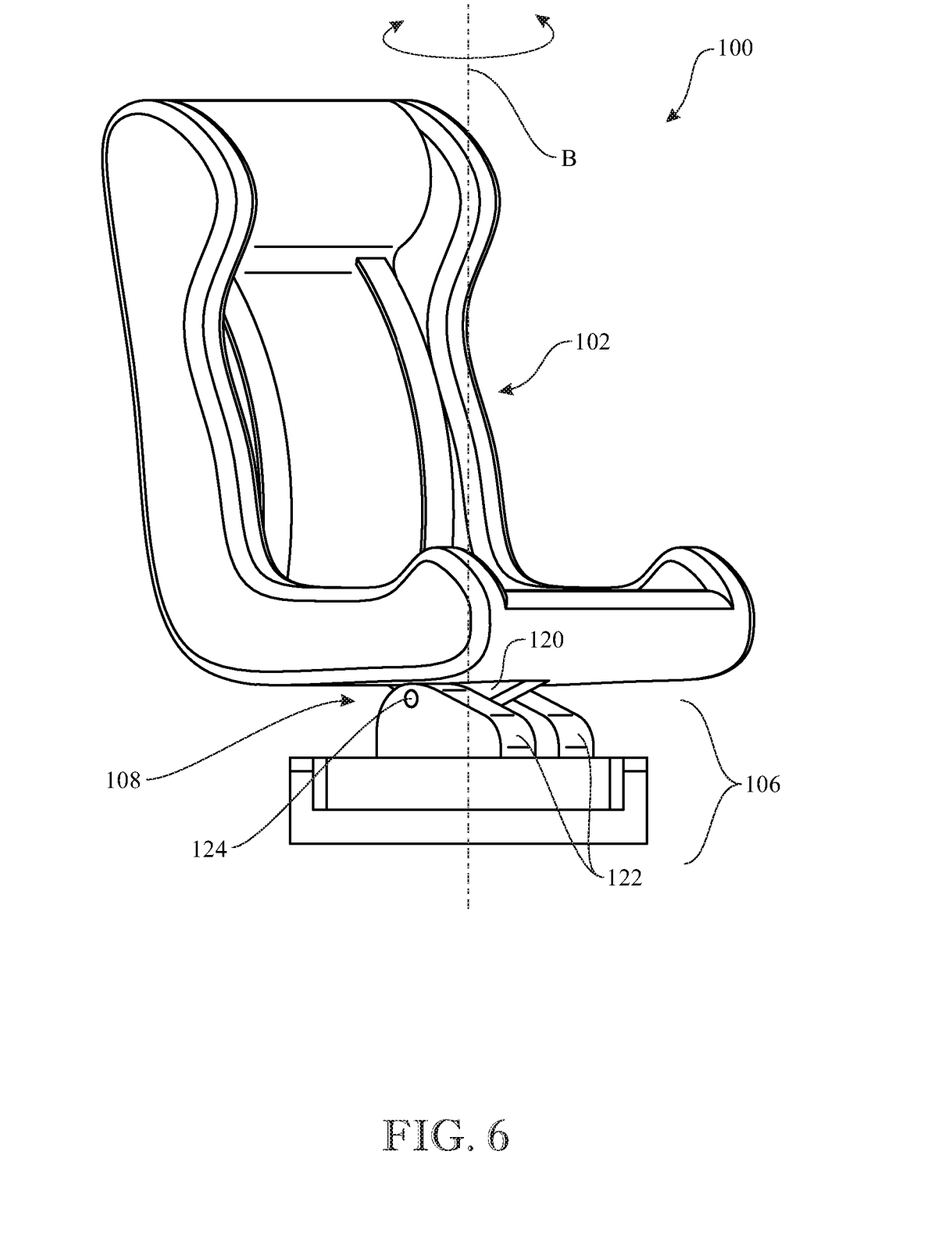
FIG. 6 presents a front isometric view of the multi-position chair originally introduced in FIG. 1, illustrating the seat of the chair in a partially rotated position.
Figure 7:
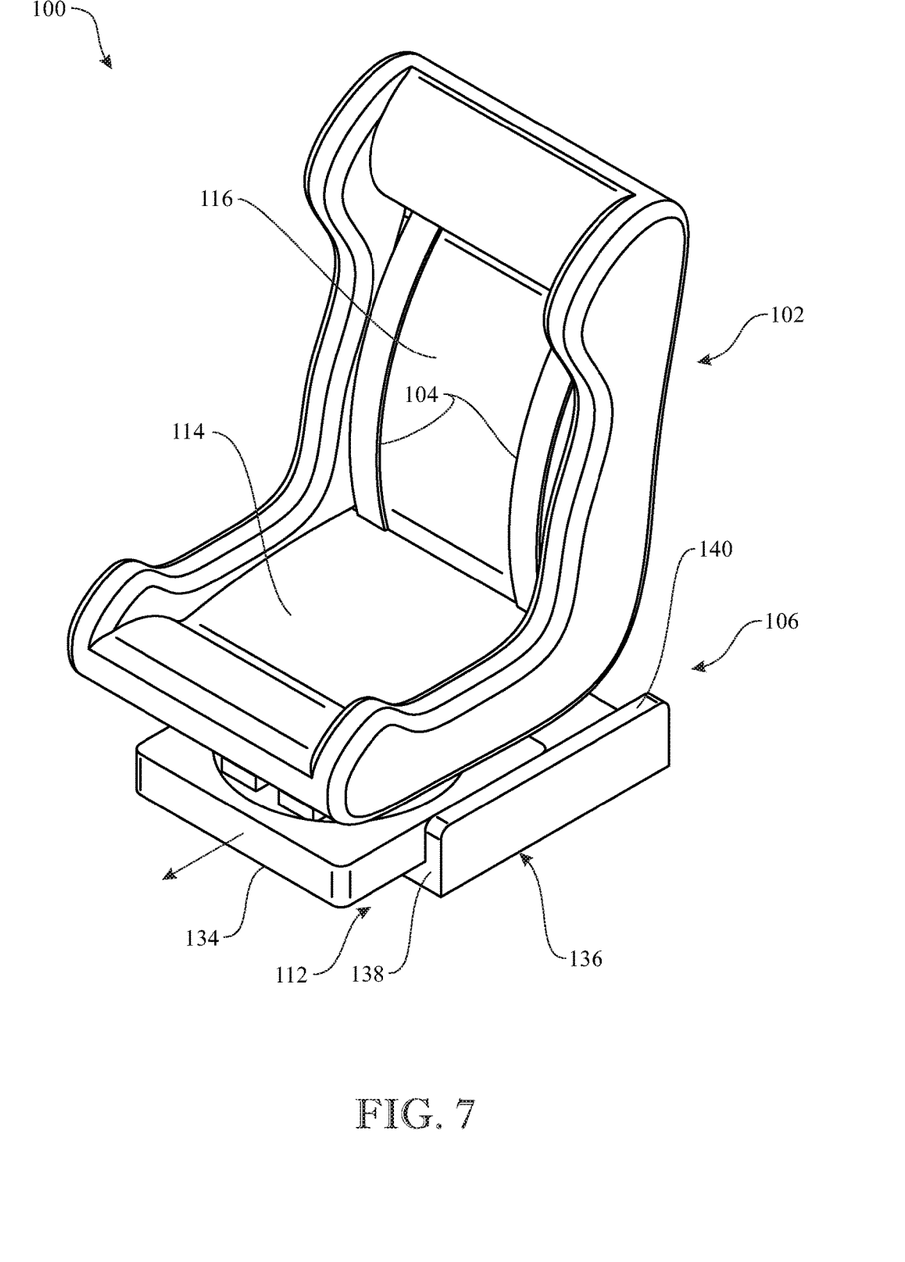
FIG. 7 presents a top isometric view of the multi-position chair originally introduced in FIG. 1, illustrating the seat of the chair slid in one direction to a displaced position.

The swivel support mechanism 110 of the base assembly 106 has first and second interengaged members 126, 128 being rotatably coupled to one another. The first of the interengaged members 126 of the swivel support mechanism 110 may be in the form of a circular- or disc-shaped plate 126. The lugs 122, being the second of the interfitted members of the tilt support mechanism 108, are fixedly supported upon the circular plate 126. The second of the interengaged members 128 of the swivel support mechanism 110 may be in the form of a cylindrical-shaped cavity 128 defined and supported by the slide support mechanism 112 that receives the circular plate 126 therein and has a circular-shaped inner rim 130 that overlies a peripheral edge 132 of the circular plate 126 so as to retain the circular plate 126 within the cavity 128. While retained within the cavity 128, the circular plate 126, and the pair of lugs 122 fixedly supported upon the circular plate 126, are able to rotate about a generally central axis B extending upright through the seat shell 102, as seen in FIGS. 1 and 6.

Figure 8:
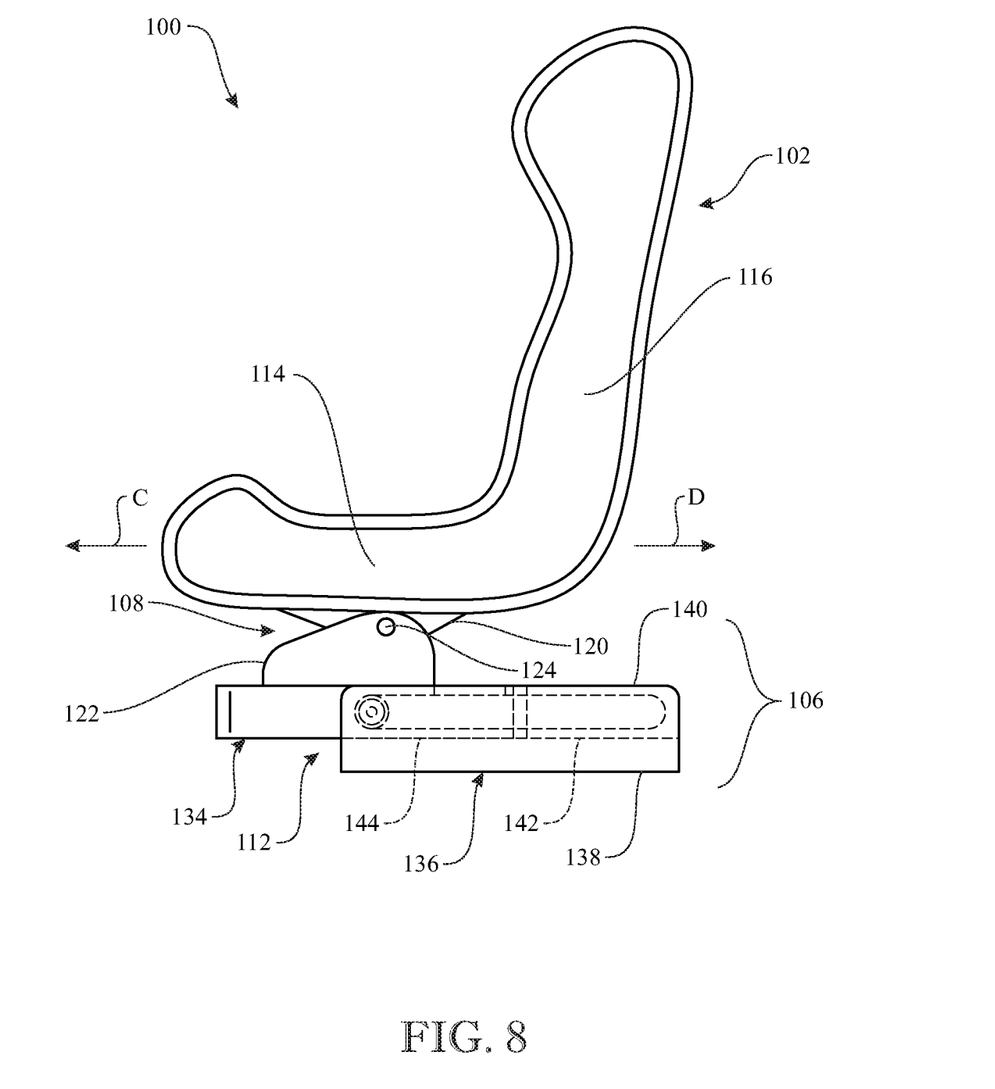
FIG. 8 presents a side elevation view of the multi-position chair of FIG. 7.
Figure 9:
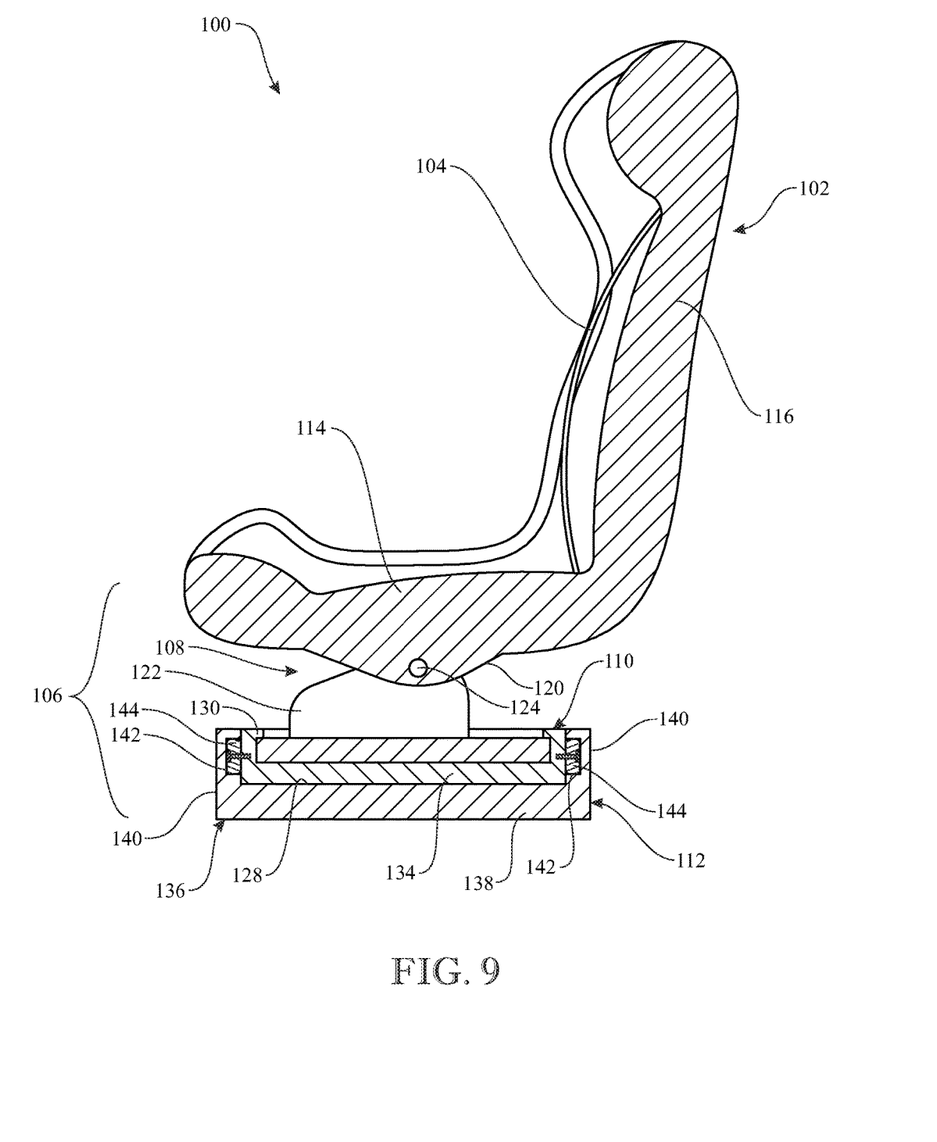
FIG. 9 presents a longitudinal sectional view of the multi-position chair taken along the section line 9-9 of FIG. 1.

The slide support mechanism 112 of the base assembly 106 has first and second intercoupled members 134, 136 being linearly displaceable, such as slidable, relative to one another. The first of the intercoupled members 134 may be in the form of a rectangular-shaped body in the form of a_hollow block 134 defining the cylindrical-shaped cavity 128, being the second of the interengaged members of the swivel support mechanism 110. The second of the intercoupled members 136 may be in the form of a platform 136 having a base 138 and pair of opposed sidewalls 140 extending upright at a corresponding pair of opposite peripheral edge portions of the base 138 and between which the block 134 is slidably mounted. The platform 136 may be configured for attachment upon a support surface, such as a rear seat in or the framework of an automobile. The pair of opposed sidewalls 140 of the platform 136 respectively define a pair of enclosed tracks 142 facing toward one another and within which are received and retained a pair of rollers 144 being centrally and rollably mounted and disposed at a corresponding pair of opposite sides of the block 134. The rollers 144 may rollably travel within the enclosed tracks 142 in either one of the opposite directions indicated by arrows C and D, as seen in FIGS. 1 and 8 (in which the seat shell 102 is shown in respective rotational positions being displaced ninety degrees from one another).

It can be readily understood that the platform 136 of the slide support mechanism 112 directly supports the block 134 in a generally upright orientation irrespective of its linearly displaced position. Also, it can be readily understood that the platform 136, via the block 134 of the slide support mechanism 112, indirectly supports the first and second of the interengaged members 126, 128 of the swivel support mechanism 110, the second of the interfitted members 122 of the tilt support mechanism 110, and ultimately the seat shell 102 in the upright orientation when the latter is in its non-tilted, upright position.

The aforementioned base assembly 106, with its pairs of members being capable of tilting, rotating and sliding relative to each other to change the chair 100 between multiple positions, may be powered manually or by use of strategically placed electric motors and one or more batteries. In fact, it would be apparent to any one skilled in the art that any mechanical mechanism on the multi-position chair 100 can be powered or used with electrical components. The clearances between the various members, or parts thereof, that are moved relative to one another may be sufficiently close or snugly fit such that the forces of friction will retain seat shell 102 at the respective position where it is placed by manipulating the tilt, swivel and/or slide support mechanisms 108, 110, 112. Also, the pin 124 may be removable so as to enable the seat shell 102 to be transferred from the multi-position chair in the car and installed onto a stroller or similar apparatus. The multi-position chair 100 may be provided for use by young children (for example, six months to three years), and also can be installed in any of the rear seats of an automobile in a rear facing or front facing position.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A multi-position chair, comprising:
    a seat shell for accommodating a child thereon, the seat shell having a bottom portion and a back portion affixed to and extending upright from said bottom portion, the bottom portion having a first fin-shaped lug depending downwardly from a lower surface thereof, the first fin-shaped lug having a transverse aperture extending completely therethrough;
    a child restraint on a front side of said back portion of said seat shell for securing the child to said seat shell; and
    a base assembly supporting the seat shell, the base assembly comprising
        a circular disk member having a pair of spaced-apart second and third fin-shaped lugs extending upwardly from an upper surface thereof and a pair of aligned transverse apertures extending through the corresponding second and third fin-shaped lugs, the first fin-shaped lug interposed between the second and third fin-shaped lugs such that the apertures of said first, second, and third fin-shaped lugs are all aligned along a common horizontal central axis,
        a pin transversely-extendible through said aligned first, second, and third apertures for selectively coupling the seat shell to the circular disk member, the first, second, and third fin-shaped lugs and the pin, together, defining a tilt support mechanism enabling forward and rearward tilting of said seat shell about said common horizontal central axis,
        a swivel base member having a circular depression provided in an upper surface thereof and a pair of roller members extending outwardly from opposite front and rear sides of the swivel base member, the circular depression having a peripheral sidewall conforming to a corresponding peripheral edge of said circular disk member, the circular depression and the circular disk member, together, defining a swivel support mechanism enabling rotation of said seat shell about a vertical central axis of said base assembly, and a lower base platform having a pair of spaced-apart front and rear sidewalls extending upwardly therefrom, each sidewall having a slot provided therein for sliding engagement with a respective one of said pair of roller members extending outwardly from the swivel base member, thereby enabling lateral sliding of the swivel base member relative to the lower base platform.

2. The multi-position chair as recited in claim 1, said swivel base further comprising an annular rim extending inwardly and partially overhanging the peripheral sidewall of said circular depression so as to retain said circular disk member within said circular depression.

3. The multi-position chair as recited in claim 1 wherein said child restraint comprises a pair of elongated seatbelts laterally spaced apart from one another and attached to said front side of said back portion of said seat shell for securing the child to said seat shell.

4. A multi-position chair, comprising:
a seat shell for accommodating a child thereon, said seat shell comprising a bottom portion and a back portion affixed to and extending upright from said bottom portion;
a child restraint on a front side of said back portion of said seat shell for securing the child to said seat shell; and
a base assembly supporting said seat shell, said base assembly comprising
a swivel support mechanism supporting said seat shell in an upright position and having first and second interengaged members rotatably coupled to one another in a manner enabling horizontal rotation of said seat shell along a central vertical axis extending through said bottom portion of said seat shell while oriented in an upright position,
a tilt support mechanism facilitating forward and rearward tilting of said seat shell relative to said swivel support mechanism, said tilt support mechanism including a pin member for selectively coupling said seat shell to said swivel support mechanism in a manner enabling said forward and rearward tilting about a central horizontal axis of said pin member, and
a slide support mechanism having first and second intercoupled members being linearly displaceable relative to one another, said second intercoupled member directly supporting said first intercoupled member in an upright orientation and thereby indirectly supporting, via said first intercoupled member, said first and second interengaged members of said swivel support mechanism in said upright orientation such that said first interengaged member rotates relative to said second interengaged member about said central vertical axis extending through said bottom portion of said seat shell in said upright position irrespective of the linear displacement of said first intercoupled member relative to said second intercoupled member.

5. The multi-position chair as recited in claim 4 wherein said first interengaged member of said swivel support mechanism comprises a circular-shaped plate; and wherein said second interengaged member of said swivel support mechanism comprises a cylindrical-shaped cavity supported by said slide mechanism and receiving and rotatably coupled to said circular-shaped plate.

6. The multi-position chair as recited in claim 5 wherein said second interengaged member of said swivel support mechanism further comprises a circular-shaped inner rim that overlies a peripheral edge of said circular-shaped plate so as to retain said circular-shaped plate within said cavity.

7. The multi-position chair as recited in claim 5 wherein said second intercoupled member of said slide support mechanism comprises a base platform defining a track; and wherein said first intercoupled member of said slide support mechanism comprises a rectangular-shaped body defining said cylindrical-shaped cavity of said swivel support mechanism and being mounted to said track of said base platform for undergoing linear movement in either one of opposite directions relative to said base platform.

8. The multi-position chair as recited in claim 4 wherein said child restraint comprises a pair of elongated seatbelts laterally spaced apart from one another and attached to said front side of said back portion of said seat shell for securing the child to said seat shell.

* * * * *